United States Patent
Cerrato

[11] Patent Number: 5,845,407
[45] Date of Patent: Dec. 8, 1998

[54] BLADE SHARPENING ACCESSORY

[76] Inventor: Jaime M. Cerrato, 67 Reynolds Ave., Parsippany, N.J. 07054

[21] Appl. No.: 799,261

[22] Filed: Feb. 13, 1997

Related U.S. Application Data

[63] Continuation-in-part of Ser. No. 630,605, Apr. 10, 1996, Pat. No. 5,727,323, which is a continuation-in-part of Ser. No. 398,173, Mar. 2, 1995, Pat. No. 5,513,436.

[51] Int. Cl.$^6$ ..................................................... B43L 23/00
[52] U.S. Cl. ....................................... 30/459; 7/160; 7/163
[58] Field of Search .................................. 431/552, 554, 431/555; 30/458, 459, 296.1, 35, 36, 37; 7/160, 163; 33/760, 768, 770; D19/73; 76/81, 81.5, 82, 82.2, 83, 88

[56] References Cited

U.S. PATENT DOCUMENTS

| 28,187 | 1/1898 | Ormiston | 76/82.2 X |
| 4,807,404 | 2/1989 | Lewis | 451/552 X |
| 5,458,534 | 10/1995 | Campione et al. | 451/552 X |

Primary Examiner—Douglas D. Watts

[57] ABSTRACT

A blade sharpening accessory, including a body member having a bottom surface with a first predetermined configuration, a top surface with a second predetermined configuration, and a recess in the top surface extending across a portion of the body member, a sharpening stone mounted in the recess so as to enable sharpening of a blade, and adhesive provided at the bottom surface of the body member for selectively fastening the body member to another article.

20 Claims, 2 Drawing Sheets

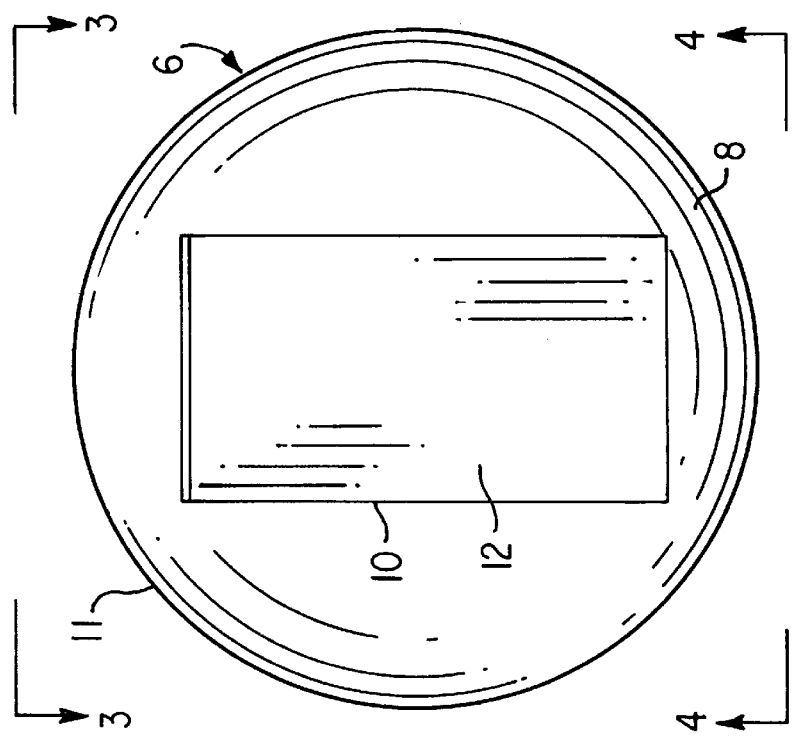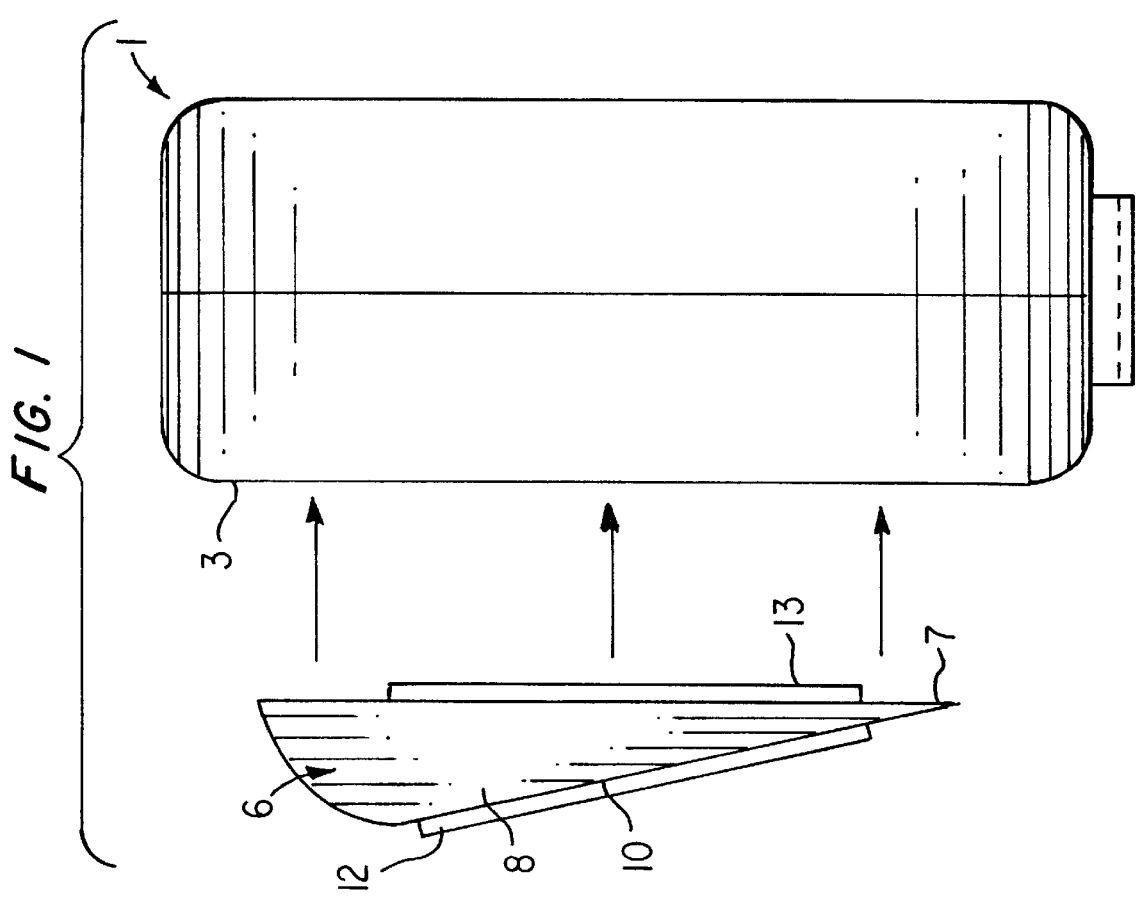

 …

BLADE SHARPENING ACCESSORY

This application is a continuation-in-part of U.S. patent application Ser. No. 08/630,605, filed Apr. 10, 1996, now U.S. Pat. No. 5,127,123 which is a continuation-in-part of U.S. patent application Ser. No. 08/398,173, filed Mar. 2, 1995, now U.S. Pat. No. 5,513,436 the disclosures of these applications are incorporated herein by reference.

BACKGROUND OF THE INVENTION

1. Field of the Invention

The present invention relates to a blade sharpening accessory, and more particularly to a sharpening stone that is configured as an accessory that can be easily attached to other articles, such as a tape measure, a tool box, a note book, the dash board of a vehicle, etc.

2. Description of the Prior Art

It is well known in the construction, carpentry and woodworking professions to use a bladed instrument, such as a utility knife, for cutting materials of various types. Due to the frequent use of the blade and the oft-times rough surface of the material being cut or scored, the blade becomes dull. Conventionally, the blade is replaced. Although this provides a sharp edge once again, it requires that a new blade be purchased. In addition to the obvious expense involved in continually purchasing new blades, the changing of the blade in a traditional utility knife requires disassembly of the knife. With disassembly of the knife there is a risk of losing not only the screw that holds the knife body together, but also any spare blades which might be stored in the body. The frequent replacement of blades also results in a large quantity of worn out blades that need to be disposed of.

In the construction trades, some individuals have been know to carry a sharpening stone in order to resharpen a dull blade. Since sharpening stones are not normally very large, they are easily misplaced and thus often cannot be found when needed

SUMMARY OF THE INVENTION

Accordingly, it is an object of the present invention to provide a blade sharpener that can be used as an accessory with numerous types of articles.

Another object of the invention is to provide a blade sharpener that is specifically intended for use with a tape measure.

Still a further object is to provide a sharpener that can be easily and securely mounted to other objects.

Pursuant to these objects, and others which will become apparent hereafter, one aspect of the present invention resides in a blade sharpening accessory comprising a body member having a bottom surface with a first predetermined configuration, a top surface with a second predetermined configuration, and a recess in the top surface that extends across the body member at a distance from the periphery of the body member. A sharpening stone is mounted in the recess in the upper surface of the body member. Furthermore, means are associated with the bottom surface of the body member for adhering the sharpener to another article, such as a tape measure, a tool box, a notebook, a car dashboard, etc.

The above-mentioned and other features and objects of this invention will become more apparent by reference to the following description taken in conjunction with the accompanying drawing.

BRIEF DESCRIPTION OF THE DRAWINGS

FIG. 1 is an exploded side view of the inventive blade sharpening accessory and a tape measure on which it can be attached;

FIG. 2 is a top view of the blade sharpening accessory of FIG. 1;

DETAILED DESCRIPTION OF THE PREFERRED EMBODIMENTS

Figure 3:
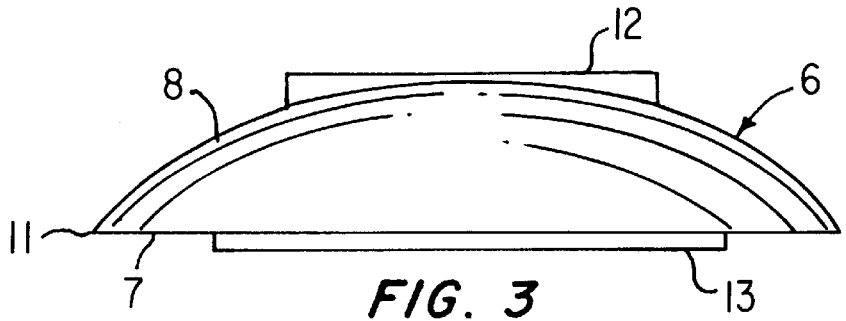
FIG. 3 is a back view of the blade sharpening accessory of FIG. 1.

Referring to FIGS. 1–5, the blade sharpening accessory of the present invention is illustrated as an accessory that can be attached to another article. The invention will be described in conjunction with a tape measure, but it is readily usable on other articles, such as tool boxes, notebooks and vehicle dash boards.

The tape measure 1, or any other article on which the blade sharpening accessory is to be fastened, has a relatively flat surface 3.

The blade sharpening accessory includes a body member 6 having a bottom surface 7 with a first predetermined configuration, illustrated in the drawings to be circular, and a top surface 8 with a second predetermined configuration. The body member 6 has a recess 10 in the top surface 8 that extends across at least a portion of the body member 6 toward a diametrically opposite peripheral side. The recess 10 is generally at a distance from the periphery 11 of the body member 6 so that a sharpening stone 12 can be securely held by the recess walls. Preferably, the sharpening stone 12 is arranged in the recess 10 so that the top surface of the sharpening stone 12 is raised above the top surface 8 of the body member 6.

The sharpening stone 12 can be mounted in the recess in any one of a number of ways. For example, the stone 12 can be glued into the recess 10, adhered to the bottom of the recess 10 by tape or VELCRO®, or press fit into the recess 10. Means 13 are provided on the bottom surface 7 of the body member 6 for mounting the body member 6 to the flat surface 3 of the article (tape measure 1). Preferably, the mounting means 13 is a thin foam or other resilient material mounted to the bottom surface 7 of the body member 6 and having an outwardly directed adhesive surface that is covered by a release sheet that can be removed to expose the adhesive when it is desired to mount the pencil sharpener to the other article. A similar mounting means can be used to mount the stone 12 in the recess 10. The mounting means 13 can be a double-sided foam tape or also a single-sided foam tape. These more permanent mounting means are well suited for mounting the blade sharpening accessory to articles that are subject to hard or rough use where the blade sharpening accessory and mounting would have to withstand blows and shocks and still remain attached to the article, such as tape measures. It is also possible to utilize a releasable fastener for the mounting means 13 when the blade sharpening accessory is intended for application to articles that are not as subject to rough use. An acceptable releasable fastener is of the hook and loop type commonly available under the Trademark VELCRO. Such a releasable fastener is desirable for use with articles such as tool boxes, notebooks and automobile dashboards.

Figure 4:
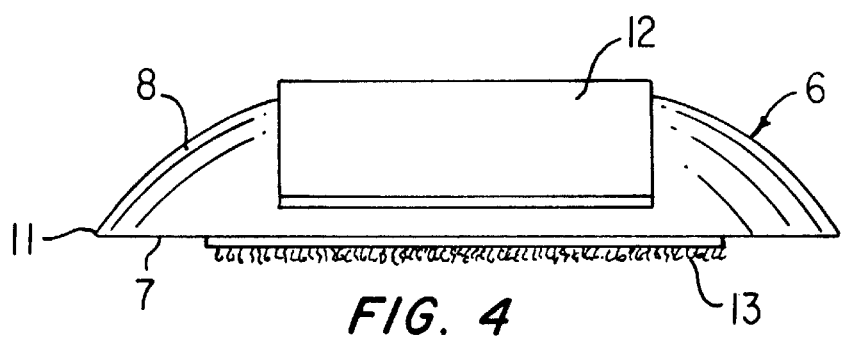
FIG. 4 is a front view of the blade sharpening accessory of FIG. 1.
Figure 5:
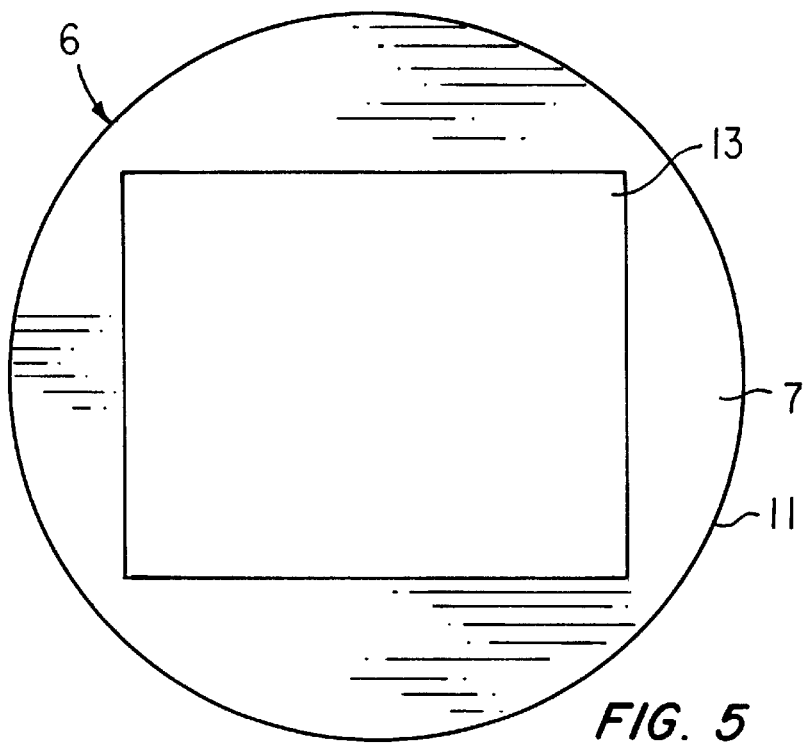
FIG. 5 is a bottom view of the blade sharpening accessory of FIG. 1.

The second predetermined configuration of the top surface 8 is such that it rises a predetermined amount from the periphery 11 and then tapers or slopes down to the opposite peripheral edge of the body member 6, substantially as shown in FIGS. 1, 3 and 4. The second predetermined configuration, including the taper or slope, is selected to provide a comfortable feel and zero interference with the hand of the user of the article on which the blade sharpening accessory is attached, or with the article itself, and to facilitate use of the sharpening stone to sharpen a blade.

The top surface 8 of the body member 6 can also have any one of a number of configurations, based upon the intended final application of the blade sharpening accessory. For example, if the blade sharpening accessory is intended to be mounted in a notebook it is shaped so as not to interfere with the operation and use of the notebook and so as to be easily and comfortably used by an individual sharpening a blade.

The configuration of the top surface 8 is such that a relatively large area thereof is smooth and open for use as advertising space.

While the invention has been described above in connection with a specific embodiment, it is to be clearly understood that this description is made only by way of example and not as a limitation to the scope of the invention as set forth in the accompanying claims.

I claim:

1. A blade sharpening accessory, comprising:
   a unitary body member having a bottom surface with a first, circular predetermined configuration, a top surface with a second predetermined configuration, and a recess in the top surface extending across a portion of the body member, the second predetermined configuration rising a predetermined amount adjacent the recess from a peripheral edge of the body member and sloping down to an apposite peripheral edge of the body member; an abrasive element mounted in the recess so as to enable sharpening of a blade; and means connected to the bottom surface of the body member for selectively fastening the body member to another article.

2. A blade sharpening accessory as defined in claim 1, wherein the bottom surface is flat.

3. A blade sharpening accessory as defined in claim 1, wherein the fastening means is adhesive fastening means.

4. A blade sharpening accessory as defined in claim 3, wherein the adhesive fastening means includes a thin resilient sheet-like member mounted to the bottom surface of the body member, the resilient sheet-like member having an outwardly directed adhesive surface and a release sheet removably attached to the adhesive surface.

5. A blade sharpening accessory as defined in claim 4, wherein the resilient sheet-like member is a foam member.

6. A blade sharpening accessory as defined in claim 3, wherein the adhesive fastening means includes an adhesive applied to the bottom surface of the body member, and a release sheet provided on top of the adhesive so as to be selectively removable therefrom.

7. A blade sharpening accessory as defined in claim 1, wherein the fastening means includes one part of a hook and loop type fastener.

8. A blade sharpening accessory as defined in claim 1, wherein the recess is rectangular in shape.

9. A blade sharpening accessory as defined in claim 1, wherein the abrasive element is a sharpening stone.

10. A blade sharpening accessory as defined in claim 9, wherein the sharpening stone is press fit into the recess.

11. A blade sharpening accessory as defined in claim 9, and further comprising means for mounting the sharpening stone in the recess.

12. A blade sharpening accessory as defined in claim 11, wherein the mounting means for the sharpening stone is a hook and loop type fastener having a first part mounted to the sharpening stone and a second part mounted to a bottom of the recess.

13. A blade sharpening accessory as defined in claim 11, wherein the mounting means is adhesive fastening means.

14. A blade sharpening accessory as defined in claim 13, wherein the adhesive fastening means includes an adhesive applied to the bottom surface of the sharpening stone, and a release sheet provided on top of the adhesive so as to be selective removable therefrom.

15. A blade sharpening accessory as defined in claim 13, wherein the adhesive fastening means includes a thin resilient sheet-like member mounted to a bottom surface of the sharpening stone, the resilient sheet-like member having an outwardly directed adhesive surface and a release sheet removably attached to the adhesive surface.

16. A blade sharpening accessory as defined in claim 15, wherein the resilient sheet-like member is a foam member.

17. A blade sharpening accessory as defined in claim 1, wherein the abrasive element is mounted in the recess so that a top surface of the abrasive element is raised above the top surface of the body member.

18. A blade sharpening accessory, comprising:
   a unitary body member having a bottom surface with a first predetermined configuration, a top surface with a second predetermined configuration, and a recess in the top surface extending across a portion of the body member, the second predetermined configuration rising a predetermined amount adjacent the recess from a peripheral edge of the body member and sloping down to an apposite peripheral edge of the body member; an abrasive element mounted in the recess so as to enable sharpening of a blade; and adhesive fastening means connected to the bottom surface of the body member for selectively fastening the body member to another article, the adhesive fastening means including a thin sheet-like member mounted to the bottom surface of the body member, the resilient sheet-like member having an outwardly directed adhesive surface and a release sheet removably attached to the adhesive surface.

19. A blade sharpening accessory as defined in claim 18, wherein the resilient sheet-like member is a foam member.

20. A blade sharpening accessory, comprising:
   a unitary body member having a bottom surface with a first predetermined configuration, a top surface with a second predetermined configuration, and a recess in the top surface extending across a portion of the body member, the second predetermined configuration rising a predetermined amount adjacent the recess from a peripheral edge of the body member and sloping down to an apposite peripheral edge of the body member; an abrasive element mounted in the recess so as to enable sharpening of a blade; and adhesive fastening means connected to the bottom surface of the body member for selectively fastening the body member to another article, the adhesive fastening means including an adhesive applied to the bottom surface of the body member, and a release sheet provided on top of the adhesive so as to be selectively removable therefrom.

* * * * *